T. M. COX.
ATTACHING DEVICE FOR AUTOMOBILE BUFFERS.
APPLICATION FILED FEB. 15, 1921.

1,381,169. Patented June 14, 1921.

INVENTOR.
Theodore M. Cox
BY John C. Watson
ATTORNEY.

UNITED STATES PATENT OFFICE.

THEODORE M. COX, OF ALBANY, NEW YORK.

ATTACHING DEVICE FOR AUTOMOBILE-BUFFERS.

1,381,169.　　　　Specification of Letters Patent.　　Patented June 14, 1921.

Application filed February 15, 1921. Serial No. 445,080.

*To all whom it may concern:*

Be it known that I, THEODORE M. COX, a citizen of the United States of America, residing at Albany, in the county of Albany and State of New York, have invented certain new and useful Improvements in Attaching Devices for Automobile-Buffers, of which the following is a specification.

My invention relates to attaching devices for automobile buffers, and the object of my invention is to provide a simple and effective device by means of which the supporting members of the buffers may be easily and securely attached to the rear of an automobile.

This device is designed to attach the supporting members of the buffers to the rear springs of an automobile and in order to insure the desired rigidity of the connection, I provide means for causing a wedging, or clamping, action between the spring and a flange of a channel cross bar, or other suitable ledge, on the automobile frame.

My improved method of attachment, and the device used in connection therewith is illustrated in the accompanying drawings in which.

The same numbers refer to the same parts throughout the several views.

Figure 1:
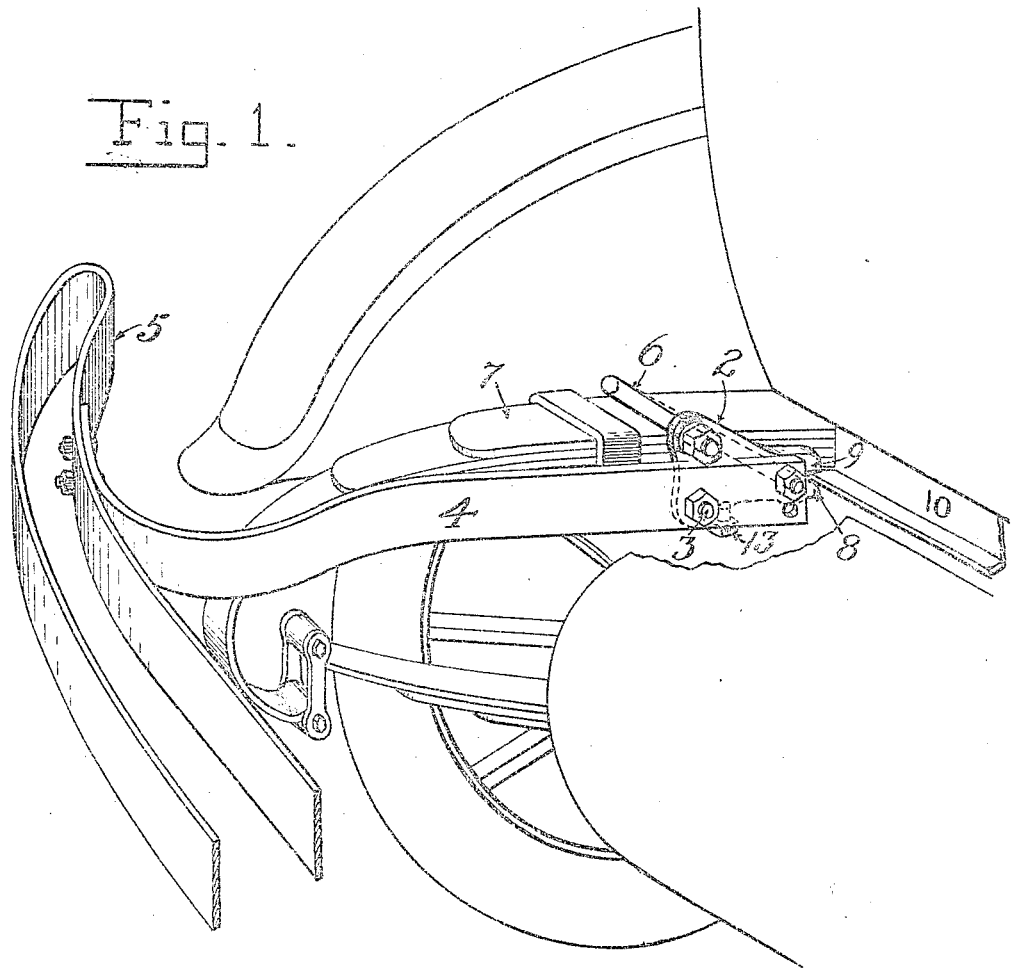
Figure 1 is a perspective view of a portion of the rear end of an automobile, and of a buffer attached thereto by means of my device.
Figure 2:
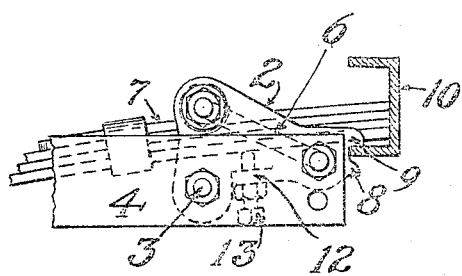
Fig. 2 is a side elevation of the attachment device and a portion of the spring and buffer supporting member and channeled cross bar of the automobile frame.
Figure 3:
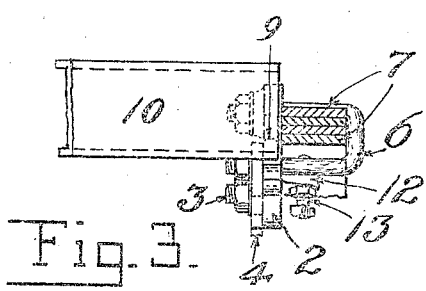
Fig. 3 is a front end elevation of the same.

Referring to the drawings—2 is the attachment plate substantially triangular in form and provided with three bolt holes one of which is adapted to receive the bolt 3 adapted to fasten the plate to the supporting member 4 of the buffer, at a point intermediate the ends thereof.

The other two holes are adapted to receive the ends of the U bolt 6, adapted to embrace the spring 7 and to fasten the plate 2 firmly against the spring; the lower leg of the U bolt also passes through a hole in the end of the buffer supporting member and clamps it against and to the plate 2, and to the spring 7.

On the end of the plate 2 are formed projections 8 and 9 adapted to rest upon a flange of the cross bar 10 of the automobile frame or other suitable support.

On the side of the plate 2, is a projection 12 adapted to carry a set screw 13, which screw is provided with a lock nut, adapted to contact with the underside of the spring 7.

The operation of my improved attaching device is as follows:

The plate 2 is fastened to the buffer supporting member by the bolt 3, and to the spring 7 by the U bolt 6; one of the projections 8 or 9, on the end of the plate is then placed on a flange of the cross bar 10, and the set screw 13 manipulated so as to cause the point thereof to contact with the underside of the spring 7 and to clamp the top leg of the U bolt and the projection resting on the flange of the cross bar, firmly against spring and cross bar flange and make a firm, rigid connection between the parts which will successfully resist lifting of the buffer.

I claim:

An attaching device for automobile buffers comprising a plate adapted to be interposed between the supporting member of the buffer and a spring of the automobile, said plate having a projection on the end thereof adapted to contact with a ledge on the automobile frame, and a projection carrying a set screw formed on the side thereof said screw so positioned that it is adapted to contact with the under side of the automobile spring when the plate is in position; a bolt adapted to fasten said plate to said buffer supporting member at a point intermediate the ends thereof; and a U bolt adapted to embrace said spring and fasten said plate and the end of said supporting member securely against said spring.

In testimony whereof I have affixed my signature.

THEODORE M. COX.